(12) United States Patent
Kuehbauch

(10) Patent No.: US 6,422,102 B1
(45) Date of Patent: Jul. 23, 2002

(54) WIPER DRIVE MECHANISM WITH A REVERSIBLE GEAR MOTOR

(75) Inventor: Gerd Kuehbauch, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/700,571

(22) PCT Filed: Feb. 29, 2000

(86) PCT No.: PCT/DE00/00581

§ 371 (c)(1),
(2), (4) Date: Apr. 12, 2001

(87) PCT Pub. No.: WO00/56582

PCT Pub. Date: Sep. 28, 2000

(30) Foreign Application Priority Data

Mar. 22, 1999 (DE) .......................... 199 12 746

(51) Int. Cl.⁷ ................ B60S 1/08; B60S 1/24
(52) U.S. Cl. ............... 74/96; 74/89.14; 15/250.3; 15/250.31; 403/122; 403/131
(58) Field of Search ............... 74/96, 98, 89.14; 15/250.3, 250.31; 403/122, 131

(56) References Cited

U.S. PATENT DOCUMENTS

| | | | | |
|---|---|---|---|---|
| 2,405,148 A | * | 8/1946 | Keahey | 384/206 |
| 2,493,552 A | * | 1/1950 | Sacchini | 15/250.23 |
| 2,544,807 A | * | 3/1951 | Sivacek | 15/250.27 |
| 2,608,707 A | * | 9/1952 | Oishei | 15/250.13 |
| 2,691,186 A | * | 10/1954 | Oishei et al. | 15/250.21 |
| 2,728,244 A | | 12/1955 | O'Shei | |
| 2,753,734 A | * | 7/1956 | Deibel | 15/250.13 |
| 3,216,753 A | | 11/1965 | Oishei | |
| 3,702,718 A | | 11/1972 | Tassell | |
| 5,176,044 A | * | 1/1993 | Bauer et al. | 15/250.27 |

FOREIGN PATENT DOCUMENTS

| | | |
|---|---|---|
| DE | 32 43 238 A | 5/1984 |
| EP | 0161168 | * 11/1985 |
| EP | 0 781 691 A1 | 7/1997 |
| JP | 6-298048 | * 10/1994 |
| WO | 94/19220 | 9/1994 |
| WO | WO 96/18528 | * 6/1996 |

* cited by examiner

Primary Examiner—Allan D. Herrmann
(74) Attorney, Agent, or Firm—Michael J. Striker

(57) ABSTRACT

A wiper drive (10, 12, 14) with a reversible geared motor (16) is fastened to a motor mounting plate (18). The driven shaft (22) of the wiper drive supports a crank (28, 30, 32), which is connected by means of at least one joint (34, 36, 38, 40) to a leaver (68, 70) of a lever mechanism. The crank is a crank plate (28, 30, 32) on which at least two adjacent joints (34, 36) for two levers (68, 70) are disposed adjacent to each other in a plane.

5 Claims, 2 Drawing Sheets

WIPER DRIVE MECHANISM WITH A REVERSIBLE GEAR MOTOR

BACKGROUND OF THE INVENTION

The invention is based on a wiper drive with a reversible geared motor.

Wiper systems of motor vehicles are as a rule fastened with a wiper support, a so-called mounting plate, to the body of a motor vehicle. The mounting plate supports a wiper drive with a wiper motor and a transmission built into it, whose driven shaft, as a rule by means of a driving crank and joint rods, drives cranks which are connected to a drive shaft for each wiper. The joint rods are linked to the driving crank by means of two ball-and-socket joints, wherein the joint axes extend coaxially. A lever mechanism of this kind comprised of the cranks and joint rods takes up a correspondingly large amount of structural space in the vehicle due to its structural height.

EP 0 781 691 A1 has disclosed a wiper drive which is comprised of an electric motor with a worm gear and a lever mechanism. An offset driving crank is supported on the driven shaft. A joint rod, which is connected to the driving crank by means of a ball-and-socket joint, is connected at its free end, likewise by means of a ball-and-socket joint, to a crank embodied as a crank plate, which is connected to a drive shaft of a wiper. By means of another ball-and-socket joint, the crank plate is engaged by a second joint rod, which is connected with its free end to a crank, which is fastened to a drive shaft for a second wiper. The lever mechanism comprised of the cranks and joint rods is very expensive and takes up a relatively large amount of structural space. Furthermore, the joint rod that leads from the driving crank to the crank of the first wiper is subjected to the driving forces of both wipers. The first joint rod and its joints must be designed accordingly.

EP 0 683 739 has disclosed a joint in which three joint parts are provided with concentrically arranged ball-shaped bearing surfaces. Each joint part is connected to a joint rod or to a driving crank. The connections of the driving crank and the joint rods require a large amount of axial space in the direction of the common pivot axis.

SUMMARY OF THE INVENTION

According to the invention, the wiper drive is comprised of a reversible geared motor whose driven shaft is connected to a driving crank which is embodied as a crank plate and drives two joint rods by means of two joints that are suitably embodied as ball-and-socket joints. These two joint rods are connected to cranks which are each connected to a drive shaft of the two respective wipers. The cranks and joint rods constitute a lever mechanism. The reversible geared motor, which replaces a conventional rotating motor, pivots the installed crank only in a limited angular range, e.g. up to 180° around the axis of the driven shaft. As a result, the joints can, according to the invention, be disposed next to each other in one plane on the crank plate, so that a very flat lever mechanism is produced.

According to one embodiment of the invention, the joints on the driving crank plate are disposed at different distances from the driven shaft. As a result, differences in the lever transmission that result from an asymmetrical position of the driven shaft in relation to the drive shafts of the wipers can be balanced out. Furthermore, different kinematics can be produced for a wiper on the driver's side and a wiper on the passenger side.

As a rule, the geared motor is screwed to a motor mounting plate by means of a screw, while the driving crank is fastened to the driven shaft with a screw. In order to limit the structural height in the direction of the driven shaft, it is suitable to offset the crank plate—in fact in such a way that its free end is a greater distance from the motor mounting plate than the part supported on the drive shaft. As a result, a space is created for the fastening screws of the geared motor, without increasing the structural height in the direction of the drive axis. There is also the possibility of fastening ball journals onto the crank plate, which point toward the motor mounting plate and consequently also do not increase the structural space in the direction of the drive axis. This type of articulation is also advantageous if only one joint rod engages the crank plate.

Since the joint rods are each subjected to only the driving forces for one wiper, they can be embodied as thin-walled and lightweight. One embodiment of the invention suggests incorporating the support socket of the ball-and-socket joint into the crank plate. Since the crank plate must be embodied as correspondingly thick in order, if necessary, to transmit double the driving forces, namely for two wipers, the joint balls and the support sockets can be embodied as sufficiently large without increasing the structural space as a result. In this connection, the joint ball can be provided with a pin on one side or can be provided with two diametrically opposed pins. In the second case, the joint rod has a fork-shaped end which is connected to the two pins, e.g. by rivets. The articulating lever can be embodied as very lightweight by being comprised of two bent sheet metal parts which are connected to each other at a central joint extending parallel to the fork-shaped ends.

Other advantages ensue from the following description of the drawings.

BRIEF DESCRIPTION OF THE DRAWINGS

Exemplary embodiments of the invention are shown in the drawings. The drawings, the description, and the claims contain numerous features in combination. The specialist will also suitably consider the features individually and will combine them into other logical combinations.

DETAILED DESCRIPTION OF THE PREFERRED EMBODIMENTS

Figure 1:
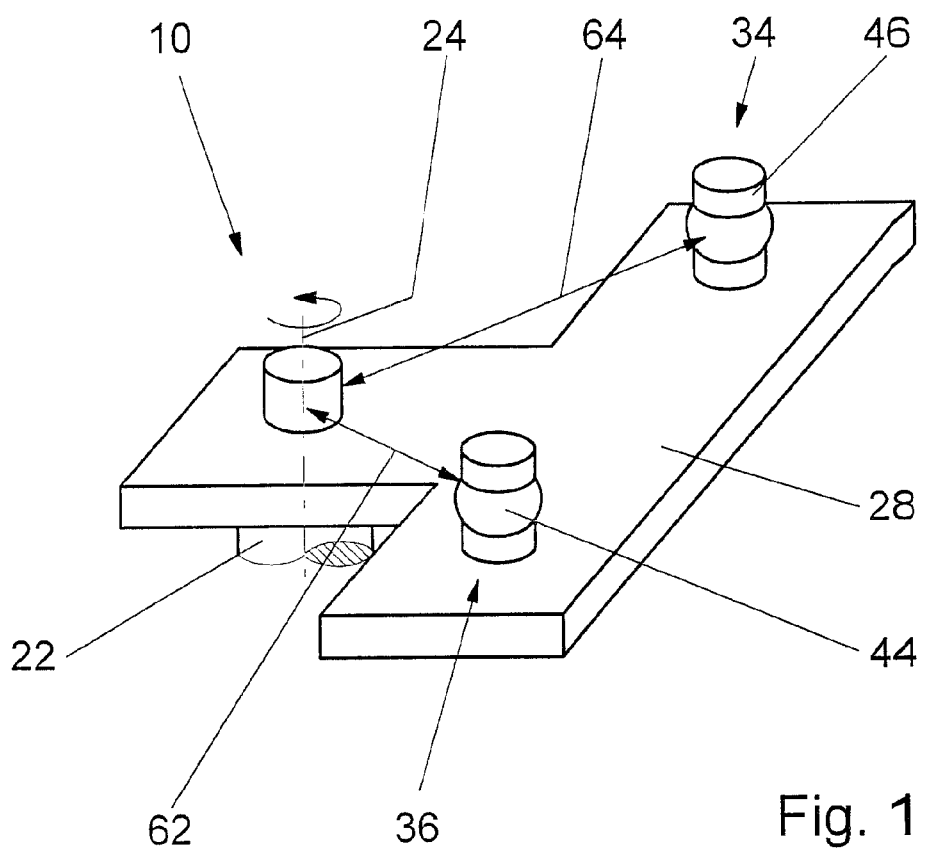
FIG. 1 is a perspective depiction of a crank plate with two joints.
Figure 2:
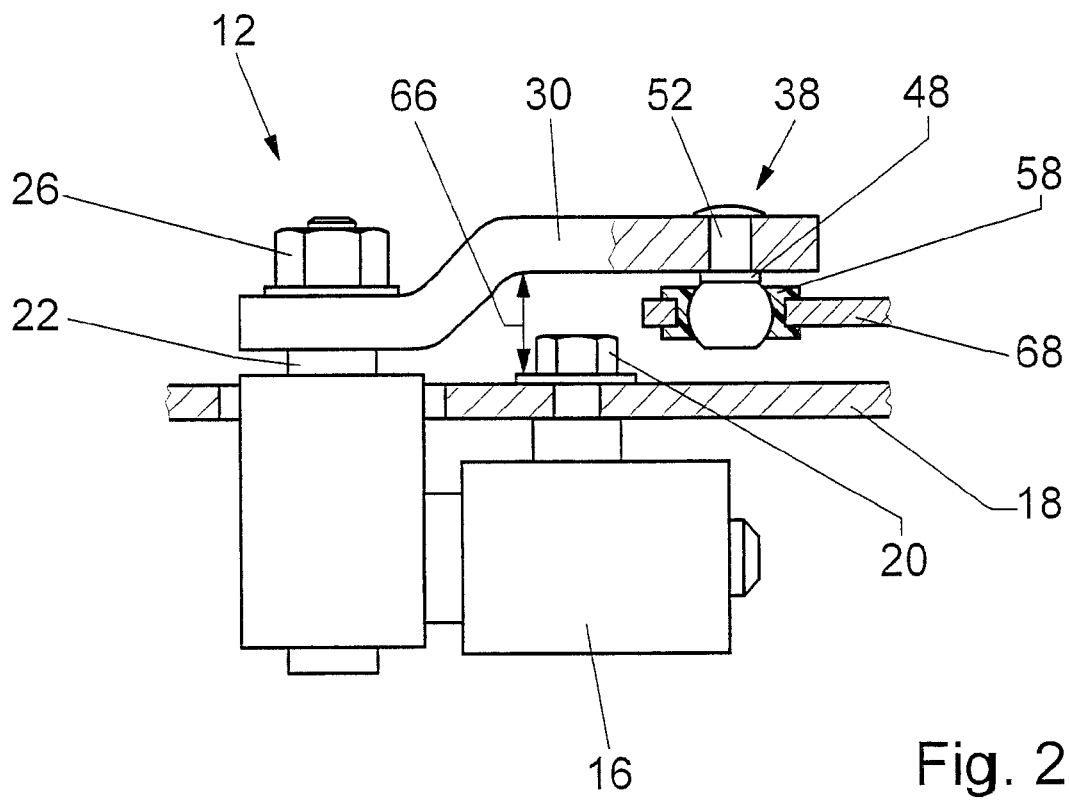
FIG. 2 is a partial longitudinal section through a variant with an offset crank plate.
Figure 3:
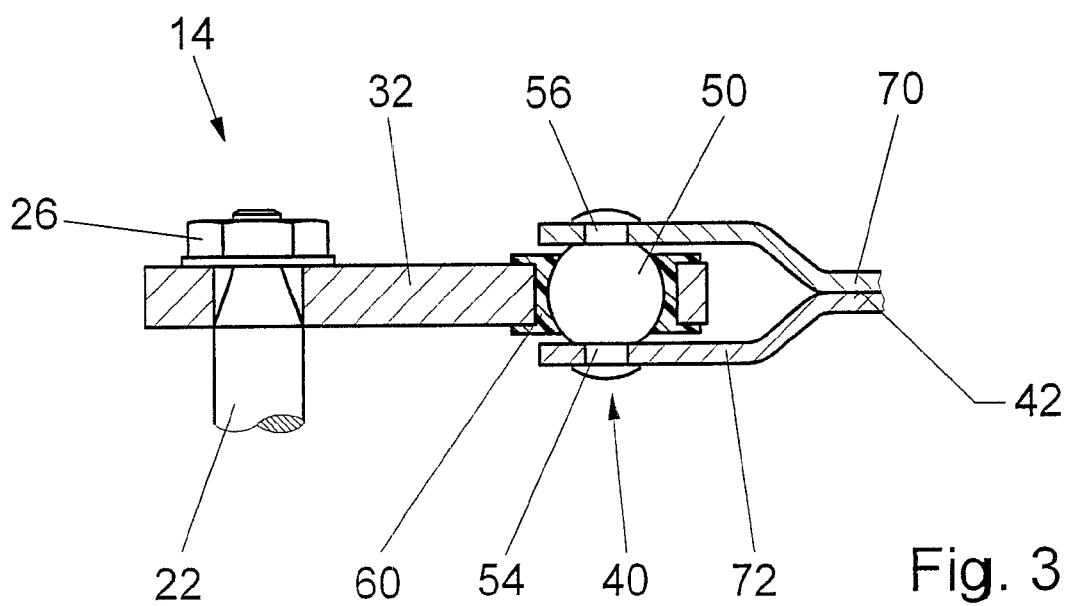
FIG. 3 shows a variant with a joint that is incorporated into the crank plate.

The wiper drives 10, 12, 14 according to FIGS. 1 to 3 have a reversible geared motor 16 shown in FIG. 2, which is connected by means of screws 20 to a motor mounting plate 18. A crank plate 28, 30, 32 is screwed to its driven shaft 22 with a screw 26. The geared motor 16 pivots the crank plate 28, 30, 32 in a limited angular range, preferably up to 180°, around an axis 24 of the driven shaft 22.

In the embodiment according to FIG. 1, the crank plate 28 is flat and supports two adjacent ball pins 44, 46 of joints 34, 36, which are each disposed a respective distance 62, 64 from the axis 24 of the driven shaft 22. The distances 62, 64 can be equal. However, they can also be designed to be different in order to embody the kinematics for the two wipers differently or in order to compensate for an asymmetrical position of the driven shaft 22 in relation to the drive shafts of the wipers. The height of the structural space required is essentially determined only by the thickness of the crank plate 28 and the height of the ball pins 44, 46.

The embodiment according to FIG. 2 differs from the embodiment according to FIG. 1 essentially in that the crank plate 30 is offset so that its free end is a greater distance 66 from the motor mounting plate 18 than the part supported by the driven shaft 22. This creates space for the fastening screws 20 of the geared motor 16. Furthermore, the greater distance 66 can be used for ball pins 48 whose pins 52 are riveted to the crank plate 30. The ball-shaped part of the ball pin 48 protruding toward the motor mounting plate 18 is encompassed by a support socket 58 which is suitably made of plastic and is injection molded onto a joint rod 68. The space available in the direction of the axis 24 of the driven shaft 22 is optimally utilized due to the parallel disposition of the drive shaft 22, the screw 20 for fastening the geared motor, and the joint 38.

In the embodiment according to FIG. 3, the crank plate. 32 is flat. However, it can also be offset similarly to the one shown in FIG. 2. It differs from the embodiments described above in that a support socket 60 made of plastic is injection molded into the crank plate 32 and encompasses a ball pin 50 in the vicinity of its ball-shaped contour. The ball pin 50 has two pins 54, 56, which are disposed diametrically opposite one another and are riveted to a fork-shaped end 72 of the joint rod 70. The joint rod 70 is comprised of two bent sheet metal parts which are connected to each other at a joint 42. The joint 42 extends in a central longitudinal plane of the joint rod 70, parallel to the fork-shaped end 72. The wall thickness of the crank plate 32 has enough space to contain the joint 40, while the thin-walled joint rod 70 does not increase the structural space in the direction of the axis 24 of the driven shaft 22. The embodiment according to FIG. 3 can also have two or more joints, similar to the embodiment according to FIG. 1.

What is claimed is:

1. A wiper drive (10, 12, 14), comprising:
 a reversible geared motor (16), said geared motor (16) fastened to a motor mounting plate (18), said wiper drive having a driven shaft (22), said driven shaft (22) supporting a crank (28, 30, 32), said crank (28, 30, 32) connected by means of at least one joint (34, 36, 38, 40) to a lever (68, 70) of a lever mechanism, wherein the crank is a crank plate (28, 30, 32) on which at least two joints (34, 36) for two levers (68, 70) are disposed adjacent to each other in a plane, wherein at least one support socket (60) is incorporated into the crank plate (32) and supports a ball pin (50) with its ball, wherein the ball pin (50) has two diametrically opposed pins (54, 56), and wherein said opposed pins (54, 56) are fastened to a fork-shaped end (72) of one of said two levers (70).

2. The wiper drive (12) according to claim 1, wherein the crank plate (30) is offset and its free end is a greater distance (66) from the motor mounting plate (18) than the part supported by the driven shaft (22).

3. The wiper drive (12) according to the preamble of claim 1, characterized in that at least one ball pin (48) is fastened to the crank plate (30), pointing toward the motor mounting plate (18).

4. The wiper drive (14) according to claim 1, wherein the lever (70) is comprised of two bent sheet metal parts and has a joint (42) which extends in a longitudinal central plane parallel to the fork-shaped end (72).

5. A wiper drive (10, 12, 14), comprising:
 reversible geared motor (16), said geared motor (16) fastened to a motor mounting plate (18), said wiper drive having a driven shaft (22), said driven shaft (22) supporting a crank (28, 30, 32), said crank (28, 30, 32) connected by means of at least one joint (34, 36, 38, 40) to a lever (68, 70) of a lever mechanism, wherein the crank is a crank plate (28, 30, 32) on which at least two joints (34, 36) for two levers (68, 70) are disposed adjacent to each other in a plane, wherein the crank plate (30) is offset in form, whereby a free end of said crank plate (30) is a greater distance (66) from the motor mounting plate (18) than a part supported by the driven shaft (22), wherein at least one ball pin (48) is fastened to the crank plate (30), pointing toward the motor mounting plate (18).

* * * * *